United States Patent [19]
Sarti

[11] 3,877,687
[45] Apr. 15, 1975

[54] SUSPENSION UNIT
[75] Inventor: Walter Sarti, Bologna, Italy
[73] Assignee: Sebac S.p. A., Bologna, Italy
[22] Filed: Jan. 26, 1973
[21] Appl. No.: 326,619

[30] Foreign Application Priority Data
Jan. 28, 1972 Italy................................ 4716B/72

[52] U.S. Cl................................. 267/8 R; 267/34
[51] Int. Cl............................................ B60e 17/00
[58] Field of Search...................... 267/34, 8 R, 61

[56] References Cited
UNITED STATES PATENTS
2,756,045 7/1956 Savory ................................ 267/8 R
3,618,927 11/1971 Nicholls............................... 267/34

*Primary Examiner*—James B. Marbert
*Attorney, Agent, or Firm*—Dr. Guido Modiano; Dr. Albert Josif

[57] ABSTRACT

A motor vehicle suspension unit with a device for varying the static load of the suspension, comprising a pair of elements telescopically guided one within the other and a spring resting with its opposing ends on stops rigid with the one and other of the telescopic elements respectively. One of the stops consists of a sleeve able to be rotated coaxially to one telescopic element and provided with cam means for its axial positioning in accordance with the angular position assumed. The sleeve comprises peripherally a plurality of axial notches. A pair of ring elements is supported on the ring. One sleeve is provided with a radial lever and an axial projection arranged to penetrate into one of the notches and the other acts as a support for a spring urging the projection into one of the axial notches. The ring is disengageable from the sleeve to rotate the lever into a position in which it does not cause trouble for the passenger.

1 Claim, 1 Drawing Figure

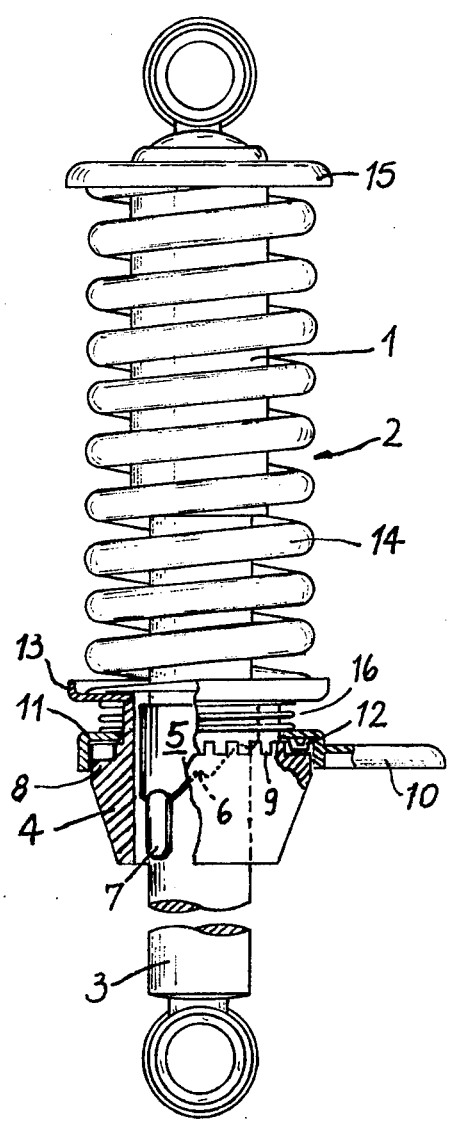

SUSPENSION UNIT

BACKGROUND OF THE INVENTION

This invention relates to a suspension unit with a device for varying the static load of suspensions for motor vehicles.

Present suspensions for motor vehicles notably comprise two cylindrical elements telescopically guided one within the other and a spring which rests with its opposing ends against stops rigid with the one and other of said telescopic elements respectively.

On these telescopic elements, the inner one is usually coupled to the frame and the other to the swinging fork which supports the wheel.

In order to vary the rigidity of the suspension according to requirements, a method has already been proposed in which the static load of the spring is varied by moving one stop of the spring along a telescopic element. To this end the stop consists of a sleeve inside of which there is a cam with a profile which comprises a number of seats at different levels on which a projection formed on the telescopic element which axially traverses said sleeve rests.

The choice of static load is made by rotating the sleeve so as to make the projection engage with a higher or lower seat.

The sleeve is rotated by a key or by acting on a lever radially rigid with it.

In the first case this gives rise to the disadvantage to the user of always having to have said key available. In the second case the lever, when it projects outside the motor vehicle, is very uncomfortable because the user can collide with it and easily catch his clothes in it.

SUMMARY OF THE INVENTION

The object of the present invention it to provide a device by which the said disadvantages are eliminated. This object is attained by a device for varying the static load in a motor vehicle suspension, comprising a pair of elements telescopically guided one within the other and a spring resting with its opposing ends on stops rigid with the one and other of said telescopic elements respectively, one of said stops consisting of a sleeve able to be rotated coaxially to one telescopic element and provided with means for its axial positioning in accordance with the angular position assumed. The sleeve comprises peripherally a plurality of notches and a pair of ring elements is supported on the sleeve, of which one is provided with a radial lever and a projection arranged to penetrate into one of said notches and the other acts as a support for the suspension spring, between said pair of rings there being disposed a spring for the engagement of said projection in the respective notch.

BRIEF DESCRIPTION OF THE DRAWING

Further details of the invention will be more evident from the description given hereinafter of one embodiment illustrated by way of example in the accompanying drawing in which:

The FIGURE shows a suspension for motor vehicles in which parts are broken away to show the structure of certain details.

DESCRIPTION OF THE PREFERRED EMBODIMENT

Said FIGURE shows a sleeve 1 which coaxially covers a telescopic cylindrical element of suspension generally indicated by the reference numeral 2. On the telescopic element or shank 3 of the suspension there is mounted a sleeve member 4 provided internally with a cam 5 having a profile which comprises a plurality of seats or recesses 6 at decreasing levels into which a projection or lug member 7 rigid with the shank 3 engages. The sleeve is angularly and axially adjustable on element 3 by means for positive displacement which will be described hereinafter.

The sleeve 4 comprises an annular step or shoulder 8 on the circumference of which there are axial notches 9 spaced equally apart angularly. An operating lever 10 is radially rigid with a ring 11 coaxially surrounding the member 4 and rests on the step 8. The ring 11 is provided with an axial projection 12 arranged for insertion into one of the notches 9. At the upper end of the sleeve 4 there is a centred ring or supporting plate 13 against which one of the ends of a coil the compression spring 14 of the suspension 2 rests, and its other end rests against a supporting plate 15 rigid with the sleeve 1. A coil spring 16 is interposed between the ring 13 and ring 11 and arranged to act on this latter so as to keep it constantly pressed against the step 8. The static load is varied by the described device in the following manner. The lever 10 is operated so as to make the sleeve member 4 rotate and bring the key 7 into engagement with one of the seats 6 corresponding to the required static load. The lever 10 may be returned to a position in which it does not give any annoyance to the user by simply raising that is axially displacing the ring 11 against the action of the spring 16 and rotating it in the desired direction for bringing the lever 10 into a non-annoying rest position.

Numerous modifications of the invention are possible all of which fall within the scope of the claims.

I claim:

1. A motor vehicle suspension unit of the type including means for varying the static load of the suspension, comprising a pair of cylindrical elements telescopically guided one within the other and each having means rigid therewith defining supporting plates, a coil compression spring having ends retained by said supporting plates, a sleeve member surrounding one of said cylindrical elements and angularly and axially adjustable thereon, said sleeve member having an inner cam surface defining recesses axially and radially spaced from one another, a lug member rigid with said one cylindrical element for engagement into said recesses, and means for positive displacement of said sleeve member thereby causing said lug member to engage a different one of said recesses for adjusting the static load of the suspension, wherein, according to the improvement, said sleeve member has an annular shoulder defining a plurality of axial notches arranged angularly spaced apart and said means for positive displacement of said sleeve member comprise a ring element surrounding said sleeve member and having a radial operating lever and at least an axial projection for engagement with said axial notches, said means further including a spring urging said axial projection into one of said notches, whereby said ring element is axially displaceable with respect to said sleeve member and disengageable therefrom for bringing said operating lever into a non-annoying rest position after positive displacement of said sleeve member.

* * * * *